(No Model.)

H. HOWSON.
BEARING.

No. 476,144. Patented May 31, 1892.

Witnesses:
Fred W. Goodwin
Murray C. Boyer

Inventor:
Henry Howson
by his Attorneys
Howson & Howson

UNITED STATES PATENT OFFICE.

HENRY HOWSON, OF PHILADELPHIA, PENNSYLVANIA, ASSIGNOR TO THE HOLMES FIBRE GRAPHITE MANUFACTURING COMPANY, OF CHICAGO, ILLINOIS.

BEARING.

SPECIFICATION forming part of Letters Patent No. 476,144, dated May 31, 1892.

Application filed September 18, 1891. Serial No. 406,089. (No model.)

*To all whom it may concern:*

Be it known that I, HENRY HOWSON, a citizen of the United States, and a resident of Philadelphia, Pennsylvania, have invented certain Improvements in Bearings, of which the following is a specification.

My invention relates to bearings in which plumbago or other lubricating material is combined with fiber, the whole being compressed into the desired form, the object of my invention being to so construct such a bearing that it will effectually withstand severe strains and shocks, my improved bearing being especially adapted for car-axle journals, stamping-machine journals, and to bearings generally which are subjected to pressure and also to severe shock and strain.

The compound I prefer to use in carrying my invention into effect is a mixture of fiber, finely-divided plumbago, and a suitable binder, preferably a drying-oil, such as linseed-oil, which will be resinified by the action of heat. In making the bearing I mix together, preferably, the fiber and plumbago; then mold the same, then saturate the molded article with the drying-oil, and then dry or heat the molded article.

Figure 1:
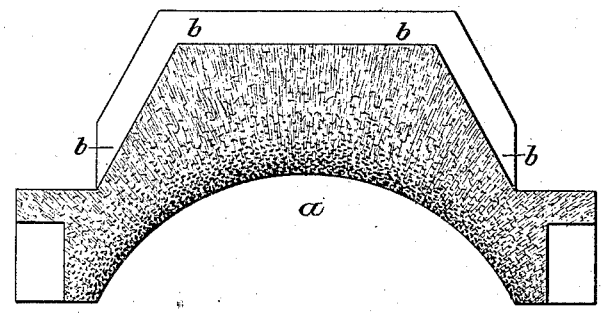
Figure 2:
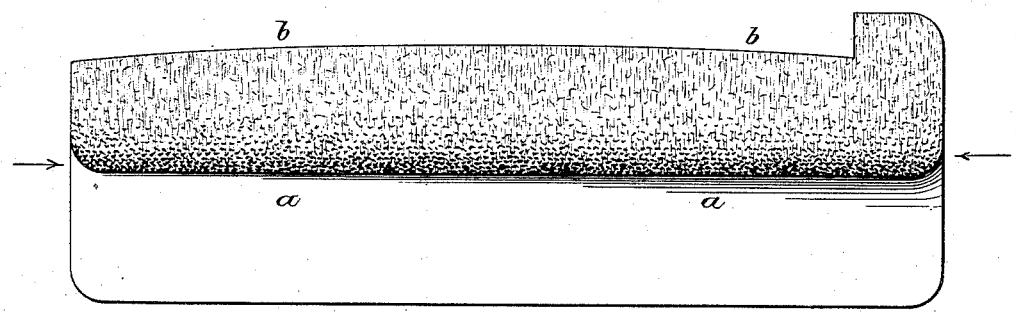

In the accompanying drawings, Figure 1 is an end view of a car-axle journal made in accordance with my invention, and Fig. 2 is a longitudinal sectional view of the same.

I so mix the fiber and plumbago together and so charge the mold that the plumbago will be in excess at the bearing-face *a*, while the fiber will be in excess at the rear *b* of the bearing.

One mode of carrying out my invention is to apply the material to the mold in layers, first placing in the mold a layer of the material in which plumbago is in excess to form the bearing-face *a*, then placing on the top of the first layer a layer of material in which the fiber is in equal proportion with the plumbago, and finally placing a layer in which the fiber is in excess of the plumbago. In fact, in some instances the final layer may be fiber alone. I then close the mold and force the plunger in from the end of the mold, so as to compress the bearing in the direction of the arrows, Fig. 2, the pores in the mold being arranged either at the face or back of the bearing, so that the liquid as it escapes from the molded mass will turn the fibers of the several layers at right angles to the bearing-surface and back of the bearing, thus felting or matting together the several layers composing the bearing, whereby when the material is compressed to the extent desired the fibers will be so intimately mixed that a homogeneous mass will be presented in which the greater portion of the plumbago will be at the bearing-surface and the greater portion of the fiber will be at the back of the bearing. Hence while I am enabled to produce a bearing having a good lubricating-surface said bearing is supported and strengthened by a backing formed of fiber, which is, however, a part of the bearing and is so intimately mixed with the plumbago and fiber at the bearing-surface that any severe strains or shocks which would under ordinary circumstances crack and destroy the bearing-surface will be taken up and sustained by the backing of fiber, the latter being tough and strong and possessing a certain amount of elasticity. In some instances the order in which the layers are placed in the mold may be reversed, the backing-fiber being placed in the mold first and the lubricating-layer last, the order depending greatly on the character of the bearing and mold.

The process above described of making the bearing is simply given as an illustration of one way of producing a bearing in accordance with my invention, and other methods may be used in carrying my invention into effect without departing from the main idea—that is to say, producing a bearing having a lubricating-face and a backing of compressed fiber which will sustain the bearing-face. In some instances where a very fine bearing-face is not required the plumbago need not be in excess of the fiber at the bearing-surface, and in lighter bearings the plumbago at the face may be in great excess and the fiber at the back may be mixed with plumbago; but the proportion of lubricating material to fiber in every case will be greater at the bearing-face than at the back.

By the term "bearing" as I use it is meant any machine, element, or structure which is subjected to friction, and although I have specified plumbago and fiber as the preferred materials to be used, respectively, as the lubricating ingredient and the supporting, strengthening, or toughening ingredient of the composition other materials having like properties may be used in place of the same without departing from my invention.

I claim as my invention—

1. A bearing composed of a lubricating material and a supporting material molded and united, the proportion of lubricating material to supporting material being greater at the face of the bearing than at the back, substantially as specified.

2. A bearing composed of a lubricating material and fiber compressed and united, the proportion of lubricating material to fiber being greater at the face of the bearing than at the back, substantially as described.

3. A bearing composed of plumbago and fiber compressed and united, the proportion of plumbago to fiber being greater at the face of the bearing than at the back, substantially as described.

4. A bearing composed of plumbago and fiber compressed and united and having at the bearing-face an excess of plumbago and at the rear an excess of fiber, substantially as described.

5. A bearing composed of lubricating material and fiber compressed and united, the lubricating material being in excess at the bearing-face and the fiber in excess at the rear, and the fibers lying transversely to the line of the bearing-face, so as to tie the bearing together transversely, substantially as described.

In testimony whereof I have signed my name to this specification in the presence of two subscribing witnesses.

HENRY HOWSON.

Witnesses:
JNO. E. PARKER,
HARRY SMITH.